United States Patent [19]

Dutil et al.

[11] Patent Number: 4,701,152
[45] Date of Patent: Oct. 20, 1987

[54] AUTOMATIC TRANSMISSION FOR MULTI-SPEED BICYCLE

[76] Inventors: Robert Dutil, 10537 Boul. Lacroix, St. Georges, Beauce-Sud, P. Q., Canada, G5Y-1K2; Raymond Gilbert, Range Des Pipins, La Guadaloupe, Beauce-Sud, P. Q., Canada, G0M-1G0

[21] Appl. No.: 865,800

[22] Filed: May 22, 1986

[51] Int. Cl.⁴ .......................... F16H 9/24; F16H 11/08
[52] U.S. Cl. ...................................... 474/70; 280/236; 474/80
[58] Field of Search ............................ 474/78, 80, 70; 280/236, 238

[56] References Cited

U.S. PATENT DOCUMENTS

| | | | |
|---|---|---|---|
| 3,303,711 | 2/1967 | Karecki et al. | 474/80 |
| 3,661,021 | 5/1972 | Ohshita | 474/80 |
| 3,830,521 | 8/1974 | Gardel et al. | 474/70 X |
| 4,099,737 | 7/1978 | Waugh | 280/261 |
| 4,201,094 | 5/1980 | Rathmell | 474/70 |
| 4,277,077 | 7/1981 | Ozaki | 280/236 |
| 4,571,219 | 2/1986 | Breden et al. | 474/70 |
| 4,580,997 | 4/1986 | Browning et al. | 474/78 |
| 4,598,920 | 7/1986 | Dutil et al. | 474/50 X |
| 4,599,079 | 7/1986 | Chappell | 474/80 |
| 4,612,004 | 9/1986 | Nagano | 474/80 |

FOREIGN PATENT DOCUMENTS 1338659  11/1973  United Kingdom ................ 280/238

Primary Examiner—George A. Suchfield
Attorney, Agent, or Firm—Murray and Whisenhunt

[57] ABSTRACT

An automatic transmission for a linked chain driven wheel includes a plurality of chain-engaging sprockets disposed coaxially with and spaced apart along the axis of rotation of the wheel. Each of the sprockets has a predetermined diameter which differs from that of the other sprockets. The sprockets are drivingly connected to the wheel. A chain guide, which is axially movable relative to the sprockets, is provided. The chain guide, when aligned with a given sprocket, will guide the drive chain into engagement with that given sprocket. A chain guide actuator is operatively connected to the chain guide for varying the axial position of the chain guide automatically in response to the angular speed of the wheel.

39 Claims, 12 Drawing Figures

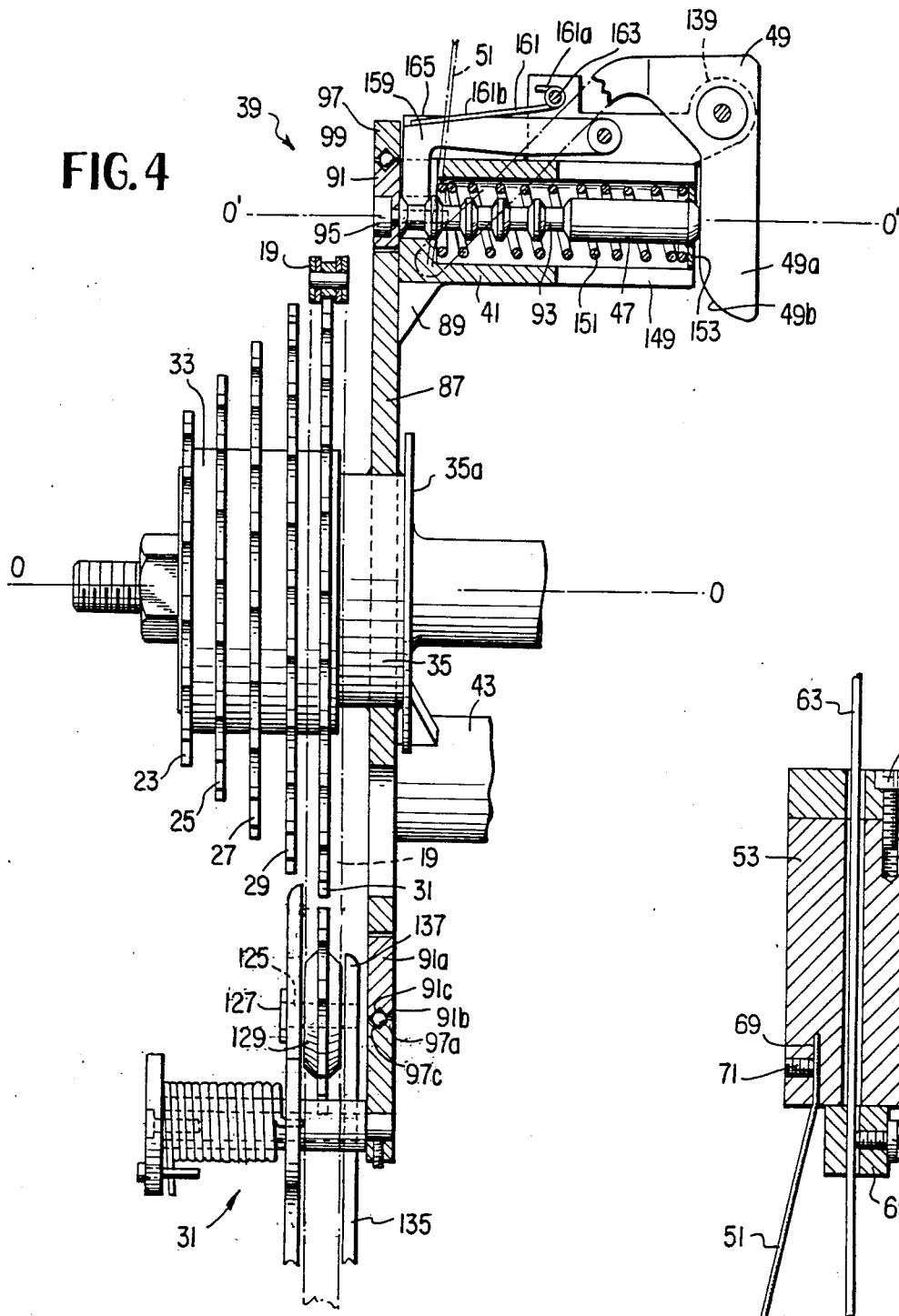
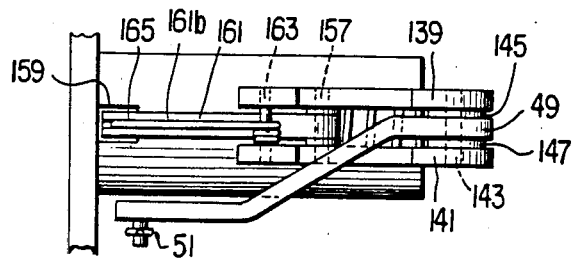
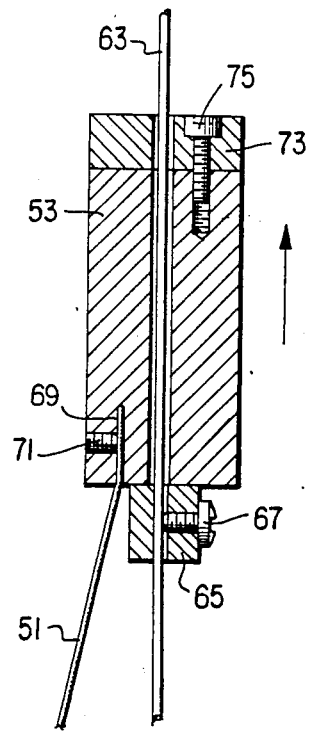
FIG. 6
FIG. 4
FIG. 7

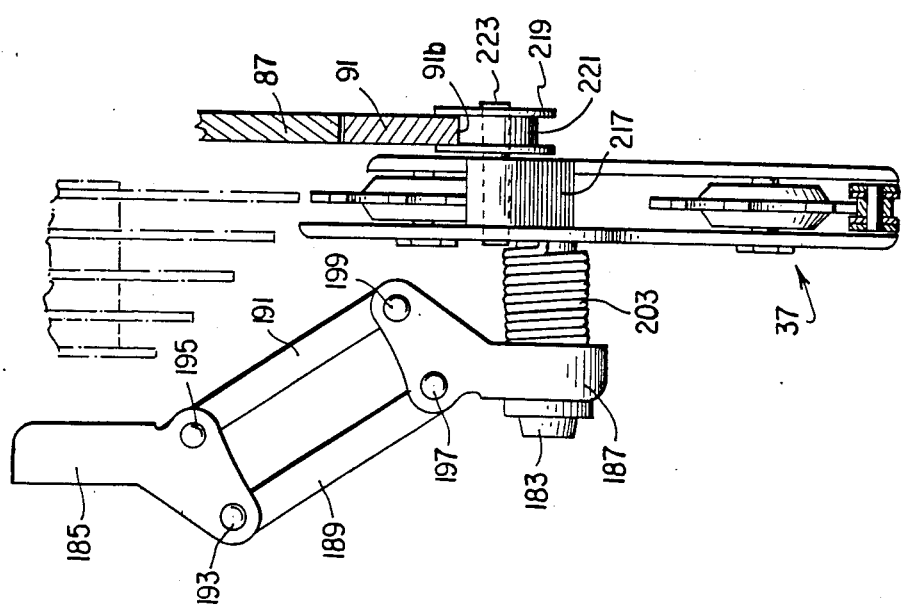
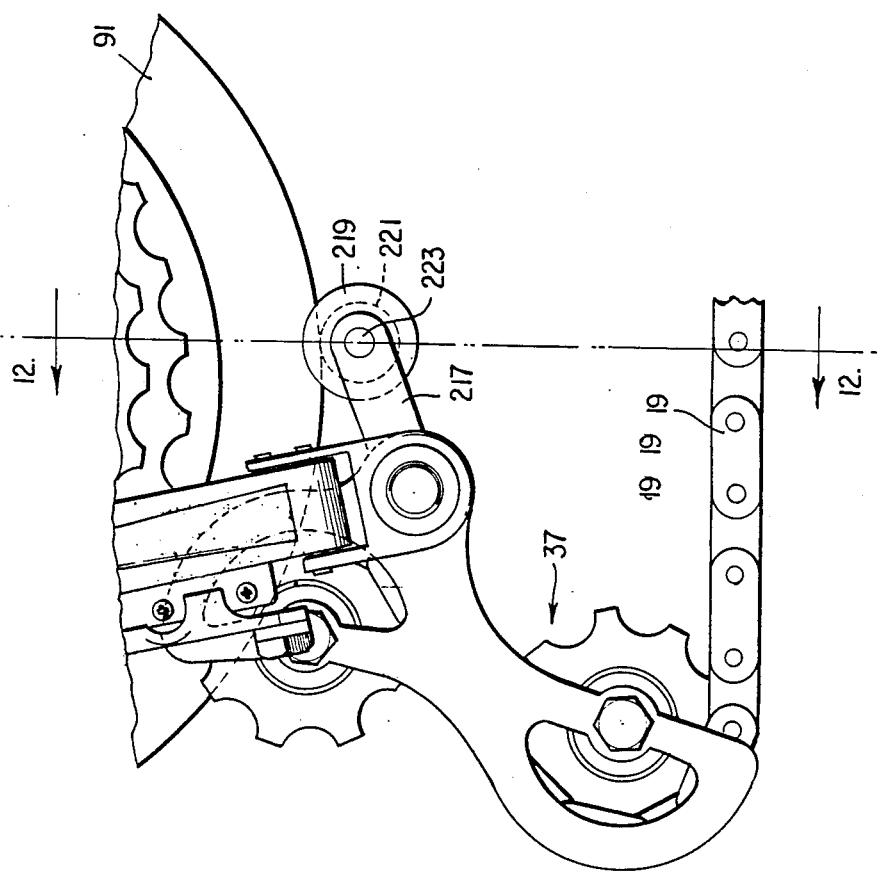
FIG. 12
FIG. 11

AUTOMATIC TRANSMISSION FOR MULTI-SPEED BICYCLE

BACKGROUND OF THE INVENTION

1. Field of the Invention:

The present invention relates to an automatic transmission for a chain-driven rotating wheel. In particular, the invention relates to a linked chain-driven wheel where the ratio of the linear speed of the chain to the angular speed of the wheel about the hub thereof is automatically and incrementally adjusted. The invention finds particular application in the provision of an automatic transmission for a bicycle and like-pedaled apparatus.

2. Description of the Prior Art:

In recent years, bicycling has enjoyed a great revival of interest. This revival has been due to an increased emphasis on exercise and physical well-being, as well as environmental considerations such as pollution problems from internal combustion exhausts and economic considerations such as the increasing expense of alternate means of transportation. This has caused bicycles to be used in a variety of riding conditions, in towns and cities and in the country, and for recreation or commutation. Due to the wide variability of bicycle uses, multi-speed bicycles, particularly 10-speed bicycles, have come into wide-spread use. These bicycles provide means for varying the transmission ratio between the pedaled sprocket and the rear wheel of the bicycle, the ratio being adjusted in discrete increments by the rider in accordance with speed and/or grade of terrain. The conventional transmission changing mechanism on 5- and 10-speed bicycles is the so-called "derailleur" mechanism. The "derailleur" utilizes multiple side-by-side sprockets of different diameters and rider-controlled levers to shift the bicycle drive chain from one sprocket to another of greater or lesser diameter.

The "derailleur" is subject to a number of well-known problems. A novice shifting the chain from sprocket-to-sprocket can cause the chain to "hang up". The requirement to operate one or more levers while shifting may divert the attention of the bicyclist from his path of travel, and the occasional bicyclist may not readily develop the "feel" necessary to make a smooth shift between adjacent sprockets.

Many attempts have been made to provide automatic and/or continuously variable transmissions for bicycles.

Hayot, U.S. Pat. No. 2,584,447, discloses a variable-speed chain driving device comprising a hub mounted on the pedal shaft of a bicycle, the hub having mounted thereon flexible arms which carry at their extremities sprocket rollers which drive the chain of the bicycle. With increasing tension of the chain, due to increasing resistance offered by the rear wheel, e.g., cycling uphill, the flexible arms tend to wrap around the hub to decrease the effective diameter of the drive sprocket defined by the sprockets mounted on the arms, thereby reducing the transmission ratio to a fixed diameter sprocket driving the rear wheel. Thus, the transmission ratio is varied continuously and automatically in response to varying rear wheel resistance.

Hunt, U.S. Pat. No. 3,798,989, discloses a manually-adjustable, multiple-speed variable transmission for a bicycle wherein the front and/or rear drive sprockets can be incrementally varied in diameter by the operator.

Chao, U.S. Pat. No. 3,837,234, discloses a bicycle with a manually-operated stepless transmission wherein the rider can manually change the depth of groove between a pair of V sheaves, which define a V-belt pulley, the V-belt transmitting force to the rear wheel of the bicycle.

Tompkins, U.S. Pat. No. 3,956,944, discloses a torque operated, variable diameter, belt sheave or chain sprocket wherein a variable diameter drive wheel is formed by sheave or sprocket elements carried between two pairs of discs. If one pair of discs rotates with respect to the other pair, as a result of a change intorque force, the sheave or sprocket elements move radially inward or outward to vary the diameter of the drive wheel. Additionally, this patent discloses a free-wheel mechanism which allows a rider to "coast" on the bicycle. In particular, a plurality of individual teeth define the diameter of a drive sprocket for a bicycle. Each of these teeth is carried by a carrier, in which the tooth is slidable. If the tooth is contacted by the bicycle chain on its rearward surface, the tooth will engage the chain and transmit drive pressure. However, if the tooth is contacted by the chain on its forward or upper surface, the tooth will be depressed into the carrier for the tooth and allow the chain to slide over the tooth.

Pipenhagan, Jr., U.S. Pat. No. 3,969,948, discloses an automatically variable speed ratio transmission for a bicycle, comprising a pedal-operated drive sprocket of variable diameter formed from a plurality of small sprockets mounted on bell-crank arms. The diameter of the so- formed sprocket being variable with the resistance to pedaling.

Leonard, U.S. Pat. No. 4,030,373, discloses a variable speed drive for a bicycle comprising a variable diameter drive mechanism formed by a mounting plate having a number of radial tracks therein, and a number of sheave elements are each movably mounted in the tracks. The rider can manually cause the elements to move in the tracks to vary the diameter of the sheave pulley formed by the elements.

Porter, U.S. Pat. No. 4,119,326, discloses a variable speed bicycle wherein the bicycle is driven by a set of variable diameter pulleys. In particular, each pulley is a V-belt pulley formed of two halves, the spacing between the halves defining the diameter at which a V-belt of fixed width will ride in the pulley. The spacing of the pulley halves is manually adjusted by the rider.

Williams, U.S. Pat. No. 4,342,449 discloses a drive system useful for a bicycle comprising a load-responsive variable diameter pulley. The variable diameter pulley is formed of a fixed plate and a movable plate, each plate is provided with slots and belt engaging elements ride between the plates and engage respective pairs of slots. As the load on the drive belt varies, the plates rotate with respect to each other and cause radial movement of the belt engaging elements, thereby varying the diameter of the pulley.

In addition to load-operated and manually adjustable transmissions, attempts have been made to produce transmissions responsive to speed of rotation.

Hohne, U.S. Pat. No. 904,330, discloses a driven shaft having a hub mounted thereon. This hub comprises a number of fixed spokes. The spokes have U-shaped cross sections and in each fixed spoke there is slidably mounted a sliding spoke which is formed at its outer end as a sector of the periphery of a belt pulley. Springs are provided which tend to pull the sectors to maximum diameter. The sliding spoke carries a pin which is engaged by a fork. This fork is pivoted about a point and carries a weight at its end. The operation of the apparatus is such that if the speed of rotation of the shaft increases, the weights will tend to move outwards and thereby exert an inwardly directed pull on the sectors. The inward movement of the sectors diminishes the diameter of the pulley. Likewise, when the speed of rotation of the shaft decreases, the weights will move inwards, aided by the springs, and thereby increase the diameter of the pulley.

Lee, U.S. Pat. No. 3,935,751, discloses a centrifugal, stepless speed changing device comprising a plurality of claw blocks mounted pivotally on a rotating disc. The outer ends of the claw blocks defining the periphery of a drive wheel. As the speed of rotation of the disc increases, the claw blocks move outward to increase the diameter of the wheel. Likewise, when the speed of the rotation of the disc decreases, the claw blocks move inward to decrease the diameter of the wheel.

Also, many attempts have been made to produce variable pulleys. Typically, such variable diameter pulleys are V-belt pulleys comprised of a pair of opposed cone discs or pulley halves which cooperate with a V-belt, the variation in diameter being achieved by adjusting the axial spacing of the pulley halves which allows the V-belt to ride higher or lower in the groove between the pulley halves. Representatives of such variable diameter V-belt pulleys are U.S. Pat. Nos. 2,321,438; to Tyler, 2,491,248 to Carrol, (disclosing a remote control linkage and idling mechanism); 2,751,790 to Ingold, (disclosing a mechanism for simultaneous, equal and opposed movement of the pulley halves to prevent lateral movement of the belt); 2,941,412 to Wrobbel, (a further mechanism for simultaneous, equal and opposed movement for the pulley halves); 3,064,486 to Aplin, (a still further mechanism to assure belt alignment by achieving simultaneous, equal and opposite movement of the pulley halves); 3,115,045 to Schaufler, (a still further mechanism to assure belt alignment with diameter variation) and 3,269,201 to Looker (a mechanism designed to prevent intrusion of dirt into and to preclude loss of lubricant from the pulley).

As may be readily ascertained from the above-noted patents, the prior art is replete with attempts to provide variable speed transmissions for bicycles by utilizing pulleys (drive wheels or sprockets) of variable diameter and, more generally, to provide pulleys of variable effective diameter. These attempts suffer from numerous defects. With respect to V-belts, a system is needed to ensure that the V-belt is not laterally displaced when the pulley halves are moved relative to one another to vary the effective diameter of the pulley. These mechanisms increase the cost of the pulley and make manufacture of the pulley more difficult. Without such a mechanism, the lateral displacement of the V-belt causes uneven and rapid wear of the belt during operation.

Moreover, belt-type drives for bicycles have generally been found to be inefficient and troublesome. In particular, belt drives tend to slip over the pulley when heavily loaded as when starting up on a bicycle or when traveling over a steep grade in the terrain. This slippage tendency is exacerbated in wet road conditions where water acts as a lubricant between the belt and pulley. Additionally, road dirt tends to act as an abrasive and increases the wear of the belt.

Mechanisms which solely rely on the speed of rotation of a driven shaft to vary drive wheel diameter, such as Hohne and Lee mentioned above, fail to take into account the variability of the driven load. Thus, while a given load will allow operation of these devices as indicated, an increase in load will increase the belt tension thereby increasing the force exerted on the variable diameter wheel. This increase in force on the wheel will tend to cause it to decrease in diameter, thereby disadvantageously affecting the speed ratio. Additionally, the mechanisms of Hohne and Lee are directed to belt drives which are susceptible to the previously noted disadvantages, per se.

Attempts to adapt variable diameter wheels to bicycles, as illustrated by the above-noted patents, have been limited to torque or load-operated mechanisms or to manually adjustable systems.

A need, therefor, continues to exist for an automatic speed ratio transmission for bicycles and like-pedaled apparatus.

SUMMARY OF THE INVENTION

The present invention provides an automatic transmission for a bicycle or like-pedaled apparatus wherein the speed ratio between the driven wheel (angular speed of the wheel) and the pedaled drive sprocket (linear speed of the chain) is automatically and incrementally adjustable in response to the speed of rotation of the driven wheel. The transmission is automatic in the sense that no rider intervention is required for speed ratio changes, the speed ratio changing solely in relation to the speed of rotation of the driven wheel. The transmission is incrementally adjustable in the sense that between previously determined upper and lower speed ratios a finite number of predetermined incremental jumps between ratios can be provided.

BRIEF DESCRIPTION OF THE DRAWINGS

FIG. 4 is a partially sectional side view of the automatic transmission of the present invention in "low" gear.

FIG. 6 is a top view of a piston assembly utilized in the automatic transmission of the present invention.

FIG. 7 is a sectioned view of a weight member of the automatic transmission of the present invention mounted on a spoke of the rear wheel of a bicycle.

FIG. 11 is a partial front view of a particularly preferred embodiment of the automatic transmission of the present invention fitted on the rear wheel of a bicycle.

FIG. 12 is a sectional view along line 12—12 of FIG. 11.

DETAILED DESCRIPTION OF THE PREFERRED EMBODIMENTS

The present invention provides an automatic transmission for a bicycle or like-pedaled apparatus. This automatic transmission which is applicable to any linked chain driven wheel comprises a plurality of chain-engaging sprockets disposed coaxially with and spaced apart along the axis of rotation of the wheel. Each of the sprockets has a predetermined diameter different from the diameter of each of the other sprockets. A drive means drivingly connects the plurality of chain-engaging sprockets to the wheel. A chain guide which engages the linked chain is provided. This chain guide is axially movable relative to the plurality of chain-engaging sprockets so as to be individually alignable with each of the sprockets in a respective plane, substantially transverse to the axis of rotation of the wheel. the chain guide guides the linked chain into engagement with the sprocket with which it is aligned. A chain guide actuator automatically varies the axial position of the chain guide in response to the angular speed of the wheel. Thus, upon angular rotation of the wheel, the chain guide is axially moved by the chain guide actuator to automatically guide the linked chain into engagement with a sprocket of a diameter in relation to the angular speed of the wheel.

Figure 1:
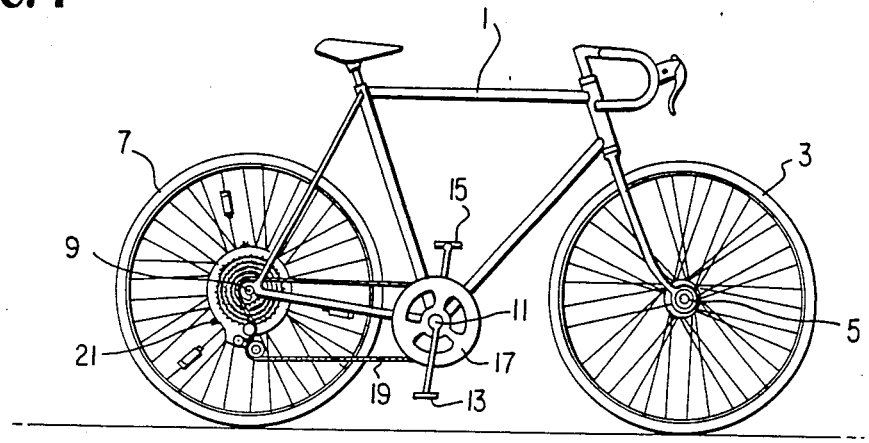
FIG. 1 illustrates a bicycle provided with automatic transmission of the present invention.

Turning now to the drawing figures, FIG. 1 illustrates a bicycle utilizing the automatic transmission of the present invention. In particular, the bicycle comprises a supporting frame (indicated generally as 1), a front ground-engaging wheel 3 mounted on an axle 5 which is mounted on the supporting frame 1, a rear ground-engaging wheel 7 drivingly mounted on a first shaft (rear axle) 9 which is journally mounted on the supporting frame 1, a second shaft 11 journally mounted on the supporting frame 1 at substantially the fore and aft center of the frame between the front and rear wheels, foot-driven pedals 13, 15 mounted on opposite ends of the second shaft 11, a drive sprocket 17 fixedly mounted on the second shaft 11 for rotation therewith, the drive sprocket 17 is located adjacent to frame 1 and inwardly of pedal 13 on that end of second shaft 11, and an endless chain loop comprising a conventional bicycle chain 19 engaging the drive sprocket 17. The bicycle chain 19 also engages the automatic transmission according to the present invention (indicated generally as 21).

The automatic transmission 21 comprises a plurality of chain-engaging sprockets, 23, 25, 27, 29 and 31 (five being illustrated, but greater or lesser numbers being utilizable depending on the number of gears desired and the desired trade-off with bulk and weight of the assembly). Each of the chain-engaging sprockets is disposed coaxially with and spaced apart along the axis of rotation 0-0 of the wheel 7. Each of the sprockets has a predetermined diameter and each diameter is different from the diameters of each of the other sprockets. Each of the sprockets is connected to a sprocket hub 33 which in turn is drivingly connected (as will be explained hereinafter) to the wheel hub 35 of wheel 7. A chain guide 37 engages the bicycle chain 19 (indicated by dot-dash lines in FIGS. 4 and 5). The chain guide 37 is axially movable relative to the plurality of chain engaging sprockets, 23, 25, 27, 29 and 31, so as to be individually alignable with each of the sprockets in a respective plane, disposed substantially transverse to the axis 0-0, containing a respective sprocket (as best seen for sprocket 23 in FIG. 5 and for sprocket 31 in FIG. 4). During operation of the bicycle, movement of the chain guide in the axial direction will cause the chain 19 to move into engagement with the sprocket with which the chain guide is aligned in a plane substantially transverse to the axis 0-0. A chain guide actuator (generally indicated at 39) is operatively connected to the chain guide 37 for varying the axial position of the chain guide in response to the angular speed of the wheel.

Figure 2:
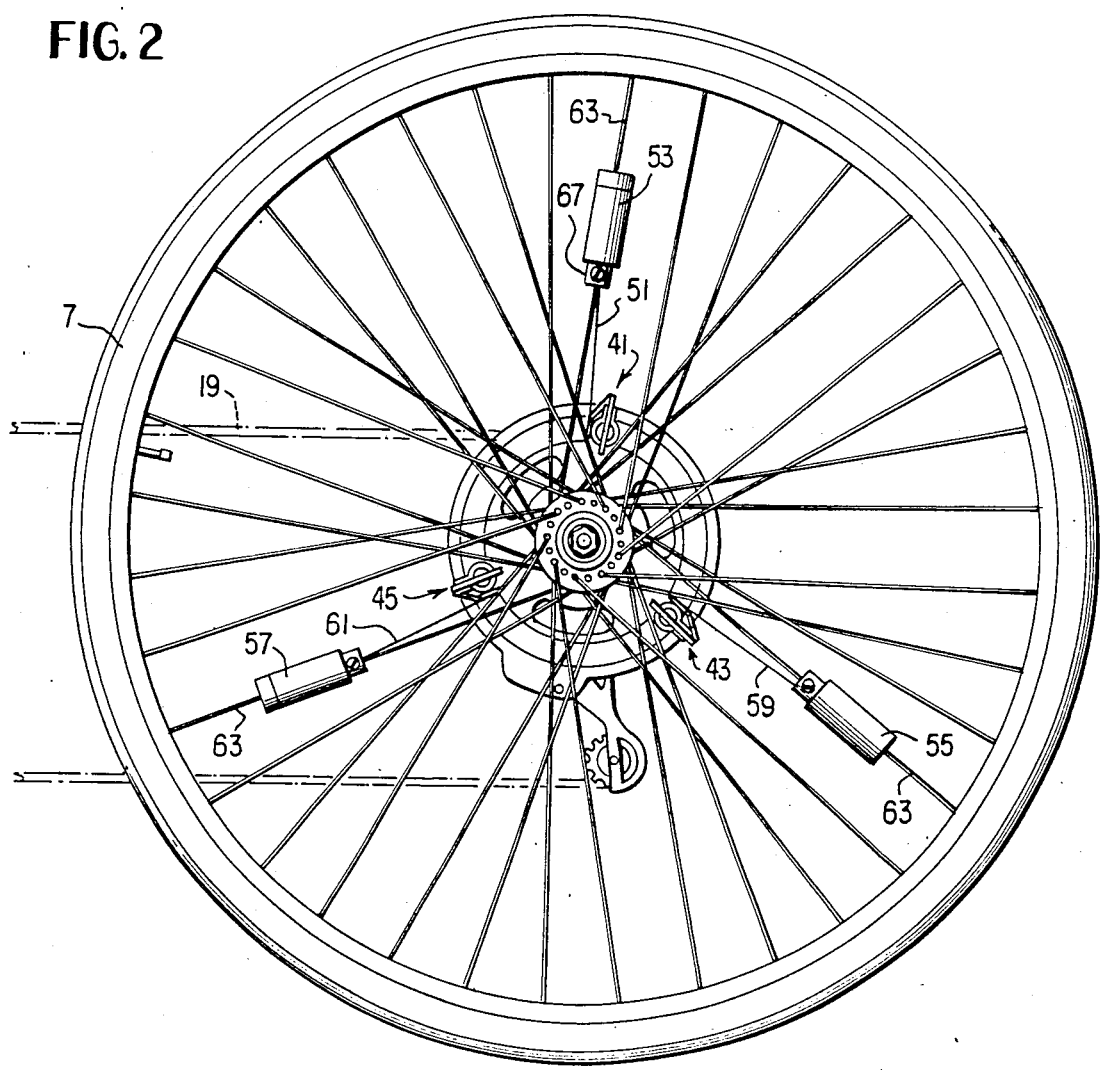
FIG. 2 is a back view of the rear wheel of a bicycle fitted with the automatic transmission of the present invention.

The chain guide actuator 39 comprises a plurality of hollow cylinders 41, 43 and 45 (three being illustrated, since three points define a plane, but greater or lesser numbers being utilizable depending on the desired trade-off between stability, bulk and weight). Each hollow cylinder has an axis 0'-0' which is substantially parallel to the axis of rotation of the wheel 0-0. Each hollow cylinder (only cylinder 41 will be discussed in detail for ease of discussion) contains a piston 47 which is axially movable therein. The piston 47 is operably connected through a bell-arm crank 49 and a cable 51 to a centrifugal force generator which comprises at least one radially displaceable weight 53. As may best be seen in FIG. 2, a radially displaceable weight 53, 55, and 57 is associated with each cylinder 41, 43 and 45, respectively, and operably connected thereto through cable 51, 59 and 61, respectively. As may best be seen in FIG. 7, the weight 53 is slidably received on wheel spoke 63. A detent 65 releasably locked on the spoke 63 by set screw 67 limits the inward movement of the weight 53 thereby maintaining cable 51 taut so as to prevent the cable from fouling in the bicycle chain 19 or with other moving parts. The cable 51 is received within recess 69 formed in weight 53 and fixedly held therein by set screw 71. While the weight 53 is an integral body, the mass of the weight 53 can be increased by attaching an additional weight 73 thereto as by a screw 75 or any other suitable connector.

Figures 5, 8:
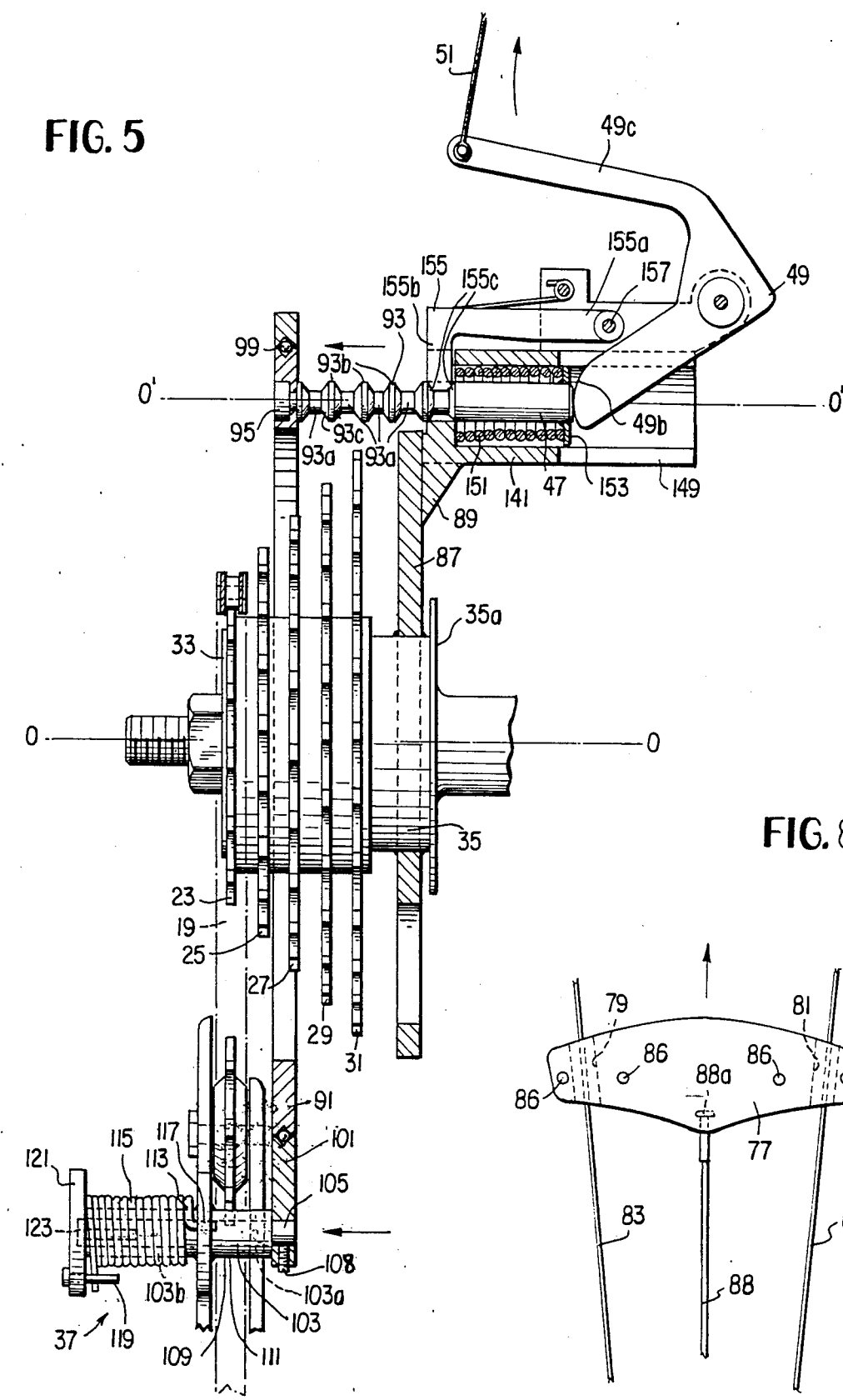
FIG. 5 is a partially sectioned side view of the automatic transmission of the present invention in "high" gear.
FIG. 8 illustrates an alternative embodiment of the weight member of the automatic transmission of the present invention mounted on a pair of spokes of the rear wheel of a bicycle.

As an alternative, the weight may be formed in the general shape of a sector of a circle as illustrated for weight 77 in FIG. 8. In this embodiment, the weight 77 has a pair of bores 79, 81 therethrough which are slidingly receivable of a pair of wheel spokes 83, 85. The bores must allow for the angle formed between the wheel spokes 83, 85 to insure that the spokes will slide within the bores. The weight 77 is operably connected to the bell-arm crank by cable 88. In this embodiment, a detent is not necessary as the size of the bores and their relation to the spokes will determine the range of sliding movement of the weight 77. This embodiment is particularly advantageous in that the weight is shaped similarly to commercially available safety reflectors and may be painted a fluorescent color or fitted with a reflector for that purpose.

As a further alternative, the weight 77 may be formed in two halves which are joined together by screws 86, so that the weight 77 can be cast in two pieces. This allows channels to be formed in the castings which will form bores 79 and 81 upon assembly and thus reduce the cost of the weight. Moreover, an appropriate channel may be formed, in one of the halves, so as to capture the head 88a of cable 88 upon assembly.

The hollow cylinder 41 is rigidly connected to support disc 87 which in turn is rigidly connected to wheel hub 35, whereby the support disc 87 will rotate about axis 0-0 as the wheel 7 rotates. The hollow cylinder 41 is preferably welded to the support disc 87 and may be provided with a reinforcing strut 89 to assure the strength and rigidity of the interconnection.

The piston 47 is rigidly connected to a first annular support 91, which is coaxial with axis 0-0 and has an inner circumferential edge 91a slightly larger in diameter than said support disc 87 and an outer circumferential edge 91b, by way of a piston rod 93. The first annular support 91 may be rigidly connected to piston rod 93 by way of screw 95 or any other suitable means. Thus, axial movement of the piston 47 along axis 0'-0' causes axial movement of the first annular support 91 along axis 0-0, as may best be seen by comparing FIG. 4 and FIG. 5.

A second annular support 97, which is coaxial with axis 0-0, is disposed about the first annular support 91. The inner circumferential edge 97a of the second annular support is slightly larger in diameter than the outer circumferential edge 91b of the first annular support. The outer circumferential edge 91b of the first annular support 91 has a groove 91c formed therein and a corresponding groove 97c is formed in the inner circumferential edge 97a of the second annular support 97. These two grooves, 91c and 97c, together from a channel which may be filled with ball bearings 99 (through an access port (not shown) formed in one of the annular supports, 91 and 97) to form a ball bearing race. Thus, the second annular support 97 is freely rotatable about axis 0-0 relative to the first annular support 91, but moves as a unit with the first annular support 91 in the axial direction. A portion 101 of the outer periphery 97b of the second annular support 97 is widened so as to facilitate connection of the chain guide 37 thereto.

Figure 3:
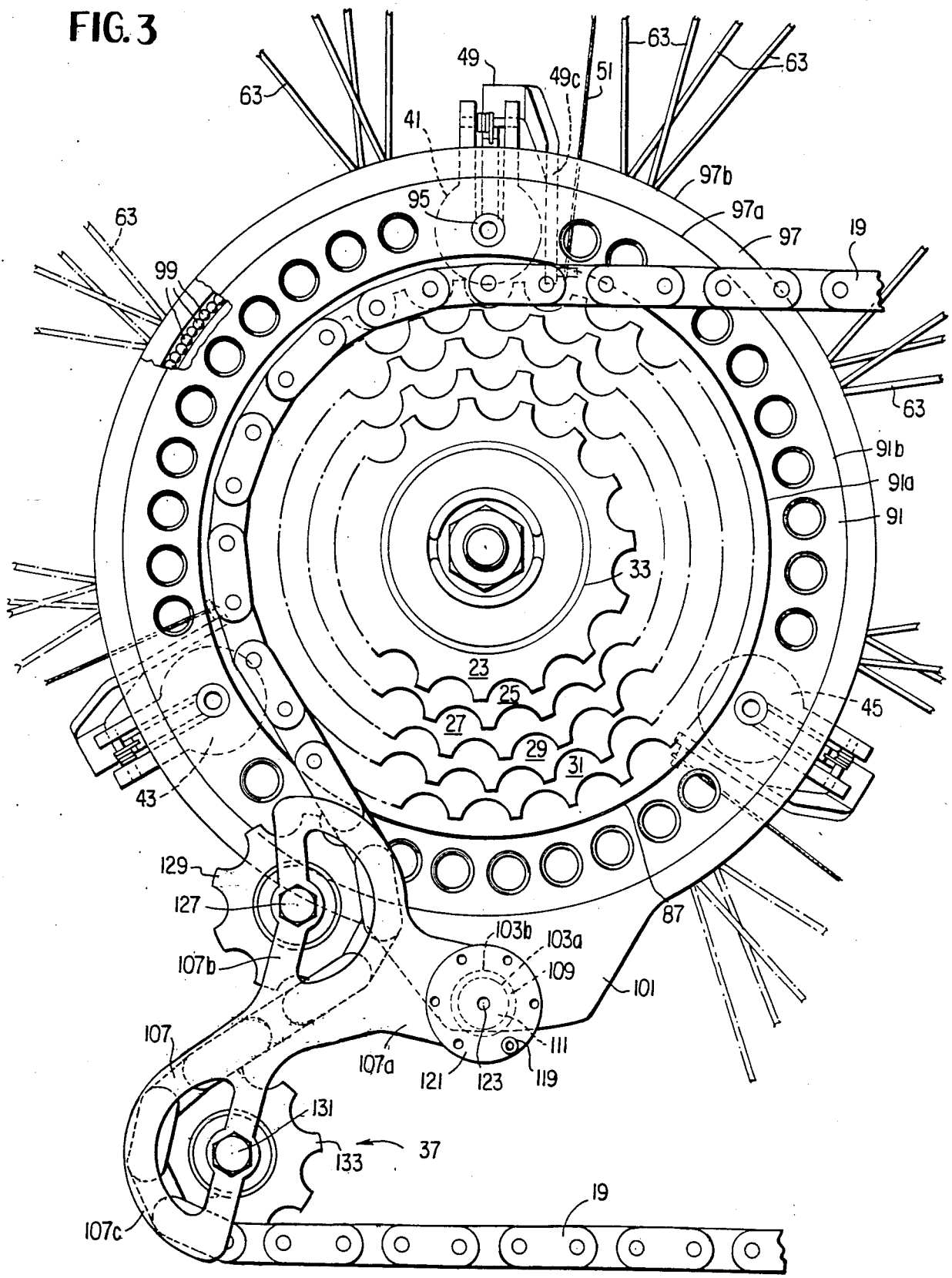
FIG. 3 is a front view of the automatic transmission of the present invention fitted on the rear wheel of a bicycle.

The chain guide 37 comprises a shaft member 103 which has a first portion 103a of lesser diameter and a second portion 103b of greater diameter. The free end of the first portion 103a is received within an aperture 105 formed in the widened portion 101 of the second annular support 97. The free end of the first portion 103a is rigidly held within the aperture 105 by set screw 108. A substantially Y-shaped planar member 107 having a collar 109 rigidly connected to one of the arms 107a of the Y, the collar extending substantially perpendicular to the plane of the Y-shaped member, is mounted for pivotal movement about the shaft member 103 by means of an aperture 111 which extends through the one arm of the Y-shaped member and the collar and which receives the first portion 103a of the shaft member therein. Axial movement of the Y-shaped member 107 is prevented by the abutment of the collar 109 against the widened portion 101 of the second annular support 97, and by the abutment of the one arm 107a of the Y-shaped member against the shoulder 113 formed between the first portion 103a and the second portion 103b of the shaft member 103. A helical spring 115 is wound about the second portion 103b of the shaft member 103. One end of the spring 115 is received in the aperture 117 formed in the one arm 107a of the Y-shaped member and the other end of the spring 115 engages a pin 119 carried by a disc 121 rigidly fixed to the free end of the second portion 103b of the shaft member 103 as by pin 123 (or any other suitable means). The other arm 107b of the Y-shaped member 107 has an aperture 125 therethrough which receives a pin 127 disposed parallel to axis 0-0. A chain-engaging sprocket 129 is rotatably mounted on the pin 127. In a like manner, the base 107c of the Y-shaped member 107 has an aperture (not shown) therethrough which receives a pin 131 disposed parallel to axis 0-0. A chain engaging sprocket 133 is rotatably mounted on the pin 131. The free ends of the pins 127 and 131 are each threaded (not shown) and screwed into a corresponding threaded aperture in a planar member 135 which is disposed in a plane parallel to the plane of the Y-shaped member 107. (Only a portion of the planar member 135 is illustrated in FIGS. 4 and 5, along with aperture 137 which receives the threaded end of pin 127.) As may be readily ascertained, the two chain-engaging sprockets, 129 and 133, are held by the Y-shaped member 107 and the planar member 135 in a plane transverse to the axis 0-0. The bicycle chain 19 is looped about the chain-engaging sprockets 129 and 133 in a serpentine manner, as best seen in FIG. 3, and the chain is thus guided into engagement with the sprocket (23, 25, 27, 29 or 31) which lies in the plane defined by the chain-engaging sprockets 129 and 133. Axial movement of the chain guide 37 which is so formed will cause shifting of the bicycle chain from one of the sprockets 23, 25, 27, 29, 31 to another of these sprockets. Additionally, by provision of the helical spring 115 by virtue of the Y-shaped member 107 being pivotally mounted on the second annular support 97, the chain guide 37 acts to tension the bicycle chain thereby taking up the "slack" in the chain when the chain is shifted. Since the helical spring 115 yieldably urges the chain into a tensioned configuration, the chain guide may readily shift the chain from a sprocket, e.g., 23, 25 or 27, of lesser diameter to a sprocket, e.g., 29 or 31, of greater diameter. Axial movement of the chain guide 37 is brought about by axial movement of the second annular support 97, which in turn is brought about by axial movement of the first annular support 91.

Axial movement of the first annular support 91 is effected by the chain guide actuator 39. As previously noted, the chain guide actuator 39 comprises three hollow cyliners 41, 43 and 45. Only cylinder 41 will be discussed in detail for ease of discussion, since the design and operation of all cylinders is identical. A piston 47 is contained within and axially movable relative to the hollow cylinder 41. The piston 47 is rigidly connected to piston rod 93 (and/or integrally formed therewith). The piston rod 93, in turn, is rigidly connected to the first annular support 91 by way of screw 95. The hollow cylinder 41 is rigidly connected to support disc 87. Thus, axial movement of the piston 47 within the hollow cylinder 41 will cause axial movement of the first annular support 91 relative to the support disc 87. Since support disc 87 is rigidly connected to wheel hub 35 and since wheel hub 35 is drivingly connected to sprocket hub 33, axial movement of the first annular support 91 will produce axial movement of the chain guide 37 relative to the sprockets 23, 25, 27, 29 and 31 which are rigidly connected to sprocket hub 33.

The end of the piston 47 opposite piston rod 93 is contacted by one arm 49a of a bell-arm crank which is pivotally connected to the hollow cylinder 41 by brackets 139 and 141 and pivot pin 143. Bushings 145 and 147 hold arm 49a in alignment with a diametric slit 149 formed in one end of the hollow cylinder 41. A biasing spring 151 contacts a washer member 153 which is rigidly fixed to the piston 47 and yieldably urges the piston 47 into engagement with a cam surface 49b formed on the arm 49a of bell-arm crank 49. The other arm 49c of the bell-arm crank 49 is connected to cable 51 which in turn is connected to radially movable weight 53. As rear wheel 7 rotates, weight 53 will generate a centrifugal force tending to pull cable 51 outwardly. In turn, the pull of cable 51 will cause bell-arm crank 49 to pivot about pivot pin 143, which in turn will cause cam surface 49b to bear on piston 47 and move piston 47 axially of said cylinder 41. Biasing spring 151 provides a lineraly increasing force which resists movement of the piston 47 as the piston moves axially under the influence of bell-arm crank 49.

The piston rod 93 is formed with alternating portions of lesser diameter 93a and greater diameter 93b. An L-shaped lever arm 155 is pivotally mounted on cylinder 41 by a pivot pin 157 extending between brackets 139 and 141, said pivot pin 157 passing through the free end of long leg 155a of the L-shaped lever. The free end of the short leg 155b of the L-shaped lever engages the piston rod 93 in portions of lesser diameter 93a between adjacent portions of greater diameter 93b. The free end of the short leg 155b passes through a slot 159 in the hollow cylinder 41 and is yieldably urged into engagement with the piston rod 93 by biasing spring 161. One end 161a of biasing spring 161 is fixedly wound about pin 163 (supported between brackets 139 and 141) and the other end 161b is received within a groove 165 formed in the edge of lever arm 155. Since the free end of the short leg 155b of the lever 155 engages the portions 93a of lesser diameter of the piston rod, a stop mechanism is formed which will hold the piston rod in discrete positions, e.g., "low" gear as shown in FIG. 4 and "high" gear as shown in FIG. 5. As will be appreciated, the portions 93a of lesser diameter are positioned and spaced so as to correspond with the positioning of the chain guide 37 in alignment with the sprockets 23, 25, 27, 29 and 31. Moreover, the free end of the short leg 155b is provided with sloped surfaces 155c which correspond to sloped surfaces 93c formed on the portions 93b of greater diameter. Thus, it becomes necessary for lever arm 155 to periodically ride up over the portions 93b of greater diameter as the piston 437 moves axially. This creates a movement of the piston in discrete increments thereby effecting discrete shifting from gear to gear.

In operation, when a cyclist first mounts the bicycle 1, spring 151 will be fully extended as shown in FIG. 4 and the bicycle transmission will be in "low" gear. As the cyclist begins pedaling, rear wheel 7 will rotate and weight 53 will start to generate centrifugal force. When the so-generated force, applied to piston 47 through cable 51d and bell-arm crank 49, exceeds the resistive force of spring 151 and the resistive force of causing lever arm 155 to ride over portions 93b of piston 93, the piston will move in a discrete increment so as to bring lever arm 155 into engagement with the next adjacent portion 93a of piston rod 93. This movement of the piston will cause the chain guide 37 to move into alignment with sprocket 29 and upon continued pedaling the chain will transfer from sprocket 31 to sprocket 29. As the speed of rotation of wheel 7 increases, the piston will move incrementally, as just described, from gear to gear until "high" gear, as shown in FIG. 5, is attained. Once "high" gear is attained, no further movement of piston 47 is possible, regardless of any increase in the speed of rotation of wheel 7, due to the full compression of spring 151. As the cyclist slows down, the gears will downshift automatically in the same manner as the speed of rotation of wheel 7 decreases and hence the centrifugal force generated by weight 533 decreases.

In order to provide motive power to the rear wheel 7 of the bicycle, the sprocket hub 33 must be drivingly connected to the wheel hub 35 which is attached to the wheel 7 by spokes 83 which in turn are connected to flange 35a formed on the wheel hub 35. In its simplest and preferred form, sprocket hub 33 and wheel hub 35 are rigidly connected to one another. However, such an arrangement requires continuous pedal movement when the bike is in motion. In order to allow "coasting" (movement of the bicycle without pedal motion as when going down-hill with gravity providing the motive force), a conventional "free-wheel" mechanism can be provided in the connection between shaft 11 and drive sprocket 17. Alternatively, the conventional "free-wheel" mechanism can be provided as the driving connection between the sprocket hub 33 and the wheel hub 35. As will be appreciated, with the use of a "free-wheel" mechanism, it is possible to generate sufficient speed on a down-hill "coast" to require a gear change. However, a gear change (shifting of the chain from one of the sprockets to another) will not occur unless the chain is being rotated. Accordingly, the bicyclist is advised to periodically pedal, even during "coasting", so as to avoid untoward pressure being applied to the chain.

The embodiment, as discussed above, utilizes 5 sprockets of decreasing diameter to afford a 5-speed transmission. However, fewer or more sprockets can be utilized to provide fewer or more gears, e.g., 3 sprockets for a 3-speed transmission or 7 sprockets for a 7-speed transmission. The primary limitation on the number of gears (sprockets) is the available path of radial movement for the radially movable weights. Thus, the outward movement of the weights, as transmitted through the cable 51 and bell-arm crank 49, determines the axial movement of the chain guide and thus, the number of sprockets which can be mounted on the sprocket hub 33. However, additional "gears" may be achieved by the use of two drive sprockets in lieu of the single drive sprocket 17 which has been illustrated. Thus, a conventional "derailleur" can be used for the drive sprockets and the automatic shifting mechanism of the present invention can be used with respect to the driven sprockets.

As will further be appreciated, the present shifting mechanism is designed to maintain a constant pedaling speed on the part of the cyclist, e.g., 45–60 rpm, under all driving conditions, as has been found desirable in conventional transmissions. Thus, the utilization of a drive sprocket 17 with 40 chain-engaging teeth and the utilization of five driven sprockets 23, 25, 27, 29 and 31 with 14, 17, 20, 24 and 28 chain-engaging teeth, respectively, has been found advantageous.

In a preferred embodiment of the invention, a support is utilized to carry some of the load on the chain guide and thus reduce torsion forces on the first annular support and hence the piston assemblies. In a particularly preferred embodiment of the invention, the second annular support is eliminated and a grooved wheel rides on the outer circumferential edge of the first annular support thereby eliminating the expense of fabricating and assembling a ball bearing race.

These embodiments are illustrated in FIGS. 9–12, wherein numbering of the elements is consistent with the description of the first discussed embodiment.

Figure 9:
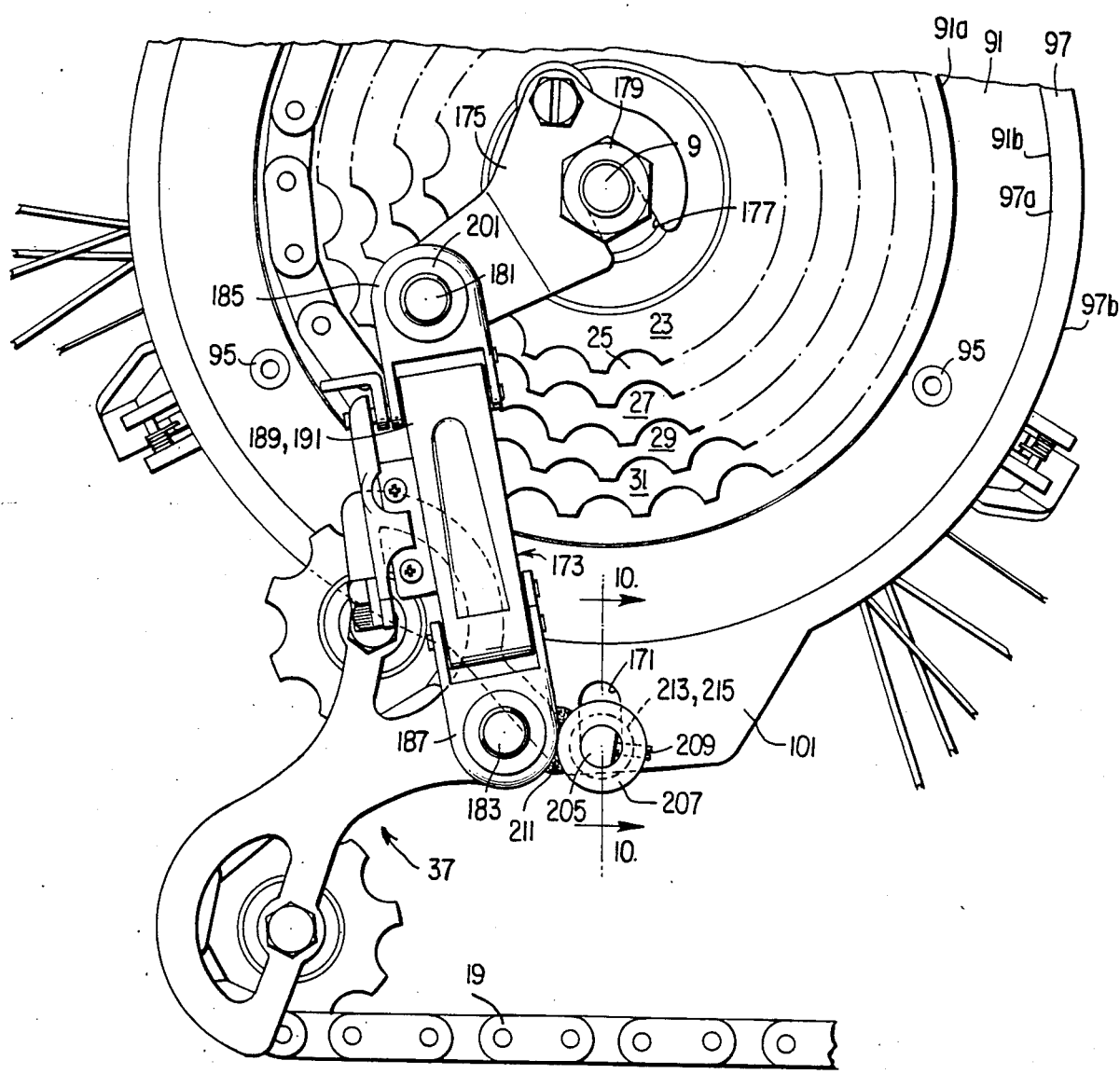
FIG. 9 is a partial front view of a preferred embodiment of the automatic transmission of the present invention fitted on the rear wheel of a bicycle.
Figure 10:
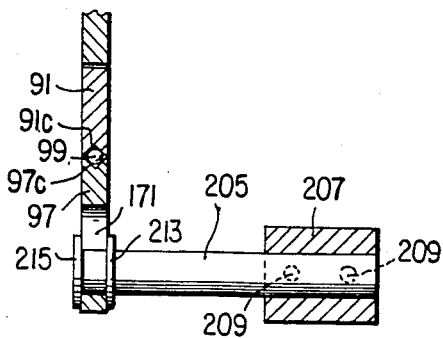
FIG. 10 is a sectional view along line 10—10 of FIG. 9.

FIG. 9 is a partial front view of the preferred embodiment of the present invention wherein the first annular support 91 has an axis corresponding to the rear axle 9, an inner circumferential edge 91a and an outer circumferential edge 91b. The first annular support 91 is disposed in a plane parallel to the plane of the chain guide 37. The first annular support is connected to the chain guide actuator (not shown) by screws 95 so as to be axially movable relative to the chain-engaging sprockets (23, 25, 27, 29, 31). A second annular support 97 also has an axis corresponding to the rear axle 9 and has an inner circumferential edge 97a and an outer circumferential edge 97b. The first annular support 91 and the second annular support are coaxially disposed in the same plane with the inner edge 97a of the second annular support 97 in sliding contact with the outer edge 91b of the first annular support 91. A widened portion 101 of the second annular support 97 has an elongated slot 171 formed therein. The first annular support 91 and the second annular support 97 are connected to each other by a ball bearing race formed by a groove 91c in the outer circumferential edge 91b of the first annular support 91 and a groove 97c in the inner circumferential edge 97a of the second annular support 97. These two grooves 91c and 97c, when aligned form a channel which may be filled with ball bearings 99 (through an access port (not shown) formed in one of the annular supports, 91 and 97). thus, the second annular support 97 is freely rotatable about the axle 9 relative to the first annular support 91, but moves as a unit with the first annular support 91 in the axial direction.

The chain guide 37 is connected to and supported from the axle 9 by a connector (generally indicated at 173) which allows axial movement of the chain guide 37 relative to the sprockets (23, 25, 27, 29 and 31). The connector 173 comprises a first support member 175 which has, at one end, a hook portion 177 receivable of the axle 9 and the hook portion may be connected to the axle 9 by hex nut 179. A first pin 181 is rigidly connected to the other end of the support member 175 and extends therefrom in a direction away from the wheel (out of the plane of the paper toward the viewer in FIG. 9) and parallel to the axis of rotation of the wheel (parallel to axle 9). A second pin 183 is rigidly connected to the chain guide 37 and extends therefrom in a direction away from the wheel and parallel to the axis of rotation of the wheel. A first end member 185 is pivotally connected to the first pin 181 for pivotal motion in a plane substantially perpendicular to the axis of rotation of the wheel. A second end member 187 is pivotally connected to the second pin 183 for pivotal motion in a plane substantially perpendicular to the axis of rotation of the wheel. A pair of parallel link members 189, 191 are independently pivotally connected to the first end member 185 at pivots 193 and 195, respectively, and to the second end member 187 at pivots 197 and 199, respectively. Each of the pivots 193, 195, 197 and 199 allows pivotal motion in a plane substantially parallel to the axis of rotation of the wheel, i.e. about an axis transverse to the axis of rotation of the wheel. The link members 189, 191 are of equal length and the pivots 193, 195 and 197, 199 are equally spaced apart. A first spring 201 connected between said first support member 175 and said first end member 185 yieldably resists pivotal motion of said first end member 185 about said first pin 181. A second spring 203 connected between said chain guide 37 and said second end member 187 yieldably resists relative pivotal motion of said second end member 187 and chain guide 37 about the second pin 183 and tensions the drive chain. The above-described linkage holds the first pin 181 and the second pin 183 parallel to one another during axial movement of the chain guide 37 relative to the plurality of chain-engaging sprockets (23, 25, 27, 29, 31).

The chain guide 37 is connected to the second annular support 97, for axial movement therewith, through the connector 173 by a third pin 205, extending parallel to the axis of rotation of the wheel, which is received within bearing 207 and rigidly, detachably held therein by set screws 209. The bearing 207, in turn, is rigidly connected to the second end member 187 as by welding (illustrated at 211). The third pin 205 has a pair of flanges 213, 215 disposed substantially perpendicular thereto and rigidly attached thereto in spaced apart relation proximate the free end of the pin. One of the flanges 213, 215 is disposed on each side of slot 171 which receives the third pin 205 therein. Thus, the flanges 213, 215 retain pin 205 within the slot 171 so that the pin 205 can slide therein but it is prevented from moving in a direction parallel to the axis of rotation of the wheel. In this regard, it should be noted that since, in connector 173, pins 181 and 183 are held in parallel and the center-to-center distance of these pins will vary with the axial movement of the chain guide 37, slot 171 must be provided to compensate for the change in center-to-center distance.

In the most preferred embodiment of the invention, as best seen in FIGS. 11 and 12, the second annular support 97 (and hence the ball bearing race) has been eliminated, as well as the third pin 205 and the bearing 207. In lieu thereof, a pivot arm 217 is pivotally connected to the chain guide 37, as by a pivot pin (not shown) extending parallel to the axis of rotation of the wheel. The pivot arm 217 is disposed substantially transverse to the axis of rotation of the wheel for pivotal motion in a plane substantially transverse to the axis of rotation of the wheel. A grooved wheel 219 having a groove 221 receivingly engageable of the outer circumferential edge 91b of annular support 91 is rotatably mounted, as by pin 223, on the free end of pivot arm 217. A biasing means, such as a spring (not shown), is connected to the pivot arm 217 and the chain guide 37 to yieldably apply a force to the pivot arm 217 causing the pivot arm 217 to pivot and press the groove 221 of the grooved wheel 219 into engagement with the outer circumferential edge 91b of the annular support 91, so that the chain guide 37 will move as a unit with the annular support 91 upon axial movement of the annular support 91.

What is claimed is:

1. An automatic transmission for a linked chain driven wheel having an axis of rotation and an axle extending along said axis of rotation, where the ratio of the linear speed of the chain to the angular speed of the wheel about said axis of rotation is automatically and incrementally adjusted, said automatic transmission comprising:

(1) a plurality of chain-engaging sprockets disposed coaxially with and spaced apart along said axis of rotation of said wheel, each of said sprockets having a predetermined diameter, each of said sprockets having a diameter different from the diameter of each of the other sprockets of said plurality of chain-engaging sprockets;

(2) drive means for drivingly connecting said plurality of chain-engaging sprockets to said wheel;

(3) chain guide means, axially movable relative to said plurality of chain-engaging sprockets so as to be individually alignable with each of said sprockets in a respective plane, substantially transverse to said axis, containing a respective sprocket, for engaging said chain and guiding said chain into engagement with said respective aligned sprocket;

(4) chain guide actuating means operatively connected to said chain guide means, for varying the axial position of said chain guide means automatically in response to the angular speed of said wheel; whereby on angular rotation of said wheel said chain guide means is axially moved by said chain guide actuating means to automatically guide said chain into engagement with a sprocket of a diameter in relation to the angular speed of said wheel.

2. The automatic transmission of claim 1, wherein said chain guide actuating means varies the axial position of said chain guide means in response to centrifugal force generated by a centrifugal force generating means, in response to the angular speed of said wheel.

3. The automatic transmission of claim 2, wherein the centrifugal force generating means comprises at least one radially displaceable weight.

4. The automatic transmission of claim 2, wherein said chain guide actuating means comprises a plurality of hollow cylinders, each having an axis, each hollow cylinder having an axially movable piston therein and each piston being operably connected to said centrifugal force generating means and said chain guide means, the axes of said hollow cylinders being substantially parallel to the axis of rotation of the wheel.

5. The automatic transmission of claim 4, wherein there are a plurality of centrifugal force generating means and each centrifugal force generating means is operably connected to a respective piston.

6. The automatic transmission of claim 5, wherein each of said centrifugal force generating means is radially movable relative to the axis of rotation of said wheel.

7. The automatic transmission of claim 6, further comprising at least one resistive force generating means for applying a force on said piston opposite to the centrifugal force generated by said centrifugal force generating means whereby the position of said piston in said hollow cylinder, and hence the axial position of said chain guide means, is determined by the relative amounts of force exerted by said centrifugal force generating means and said resistive force generating means.

8. The automatic transmission of claim 7, wherein said at least one resistive force generating means comprises at least one spring disposed to act on said piston.

9. The automatic transmission of claim 8, wherein said drive means connects said plurality of chain-engaging sprockets to said wheel in order of decreasing diameter with increasing axial distance from said wheel.

10. The automatic transmission of claim 9, wherein as the centrifugal force increases by increased angular speed of said wheel, the centrifugal force generating means tends to move radially outwardly, the piston tends to move axially away from said wheel, and hence the chain guide means tends to engage the chain with a sprocket of smaller diameter, whereby the ratio of the angular speed of the wheel to the linear speed of the chain automatically increases and vice-versa.

11. The automatic transmission of claim 10, wherein said wheel is a spoked wheel and said centrifugal force generating means is connected to one end of a cable, the other end of the cable is connected to one arm of a bell crank, and the other arm of the bell crank bears on said piston, each said centrifugal force generating means is a weight slidably disposed on at least one spoke of said spoked wheel.

12. The automatic transmission of claim 1, wherein said plurality of chain-engaging sprockets are disposed in order of decreasing diameter with increasing axial distance from said wheel.

13. The automatic transmission of claim 12, wherein said plurality of chain-engaging sprockets comprises five sprockets.

14. The automatic transmission of claim 1, wherein said drive means comprises a gear hub body having an axis, said plurality of chain-engaging sprockets disposed coaxially with and spaced apart along said axis of said gear hub body, said plurality of chain-engaging sprockets rigidly connected to said gear hub body, said gear hub body disposed coaxially adjacent said wheel, said gear hub body drivingly connected to said wheel.

15. The automatic transmission of claim 1, wherein said gear hub body is rigidly connected to said wheel.

16. The automatic transmission of claim 1, wherein said wheel comprises wheel hub having an axis of rotation and a plurality of substantially radially disposed spokes.

17. The automatic transmission of claim 1, wherein said chain guide actuating means comprises
a plurality of hollow cylinders, each having an axis, disposed about and radially spaced apart from said wheel hub, each hollow cylinder hvaing its axis substantially parallel to said wheel hub axis, each hollow cylinder slidably axially receivable of a piston;
support means for supporting said plurality of hollow cylinders about and radially equidistant from said wheel hub, said plurality of cylinders rigidly connected to said support means, said support means rigidly connected to said wheel hub;
a plurality of pistons, each associated with a respective hollow cylinder and axially slidably received therein, each said piston rigidly connected to said chain guide means;
force generating means, operably connected to said plurality of pistons, for generating a force to cause axial movement of said pistons in response to the angular speed of said wheel.

18. The automatic transmission of claim 17, wherein said support means comprises a substantially circular disc disposed about said wheel hub.

19. The automatic transmission of claim 17, wherein said force generating means comprises
centrifugal force generating means for generating a radially outward directed force in response to angular rotation of said wheel;
directional conversion means, operably connected to said centrifugal force generating means and said plurality of pistons, for converting said radially outward directed force into an axially directed force.

20. The automatic transmission of claim 19, wherein said directional conversion means comprises a bell crank having one arm connected to said centrifugal force generating means and the other arm in force applying contact with said piston.

21. The automatic transmission of claim 20, wherein said force generating means further comprises resistive force generating means for applying a force on said piston opposite to the force applied by said other arm of said bell crank whereby the position of said piston in said hollow cylinder, and hence the axial position of said chain guide means, is determined by the relative amounts of force exerted by said centrifugal force generating means and said resistive force generating means.

22. The automatic transmission of claim 21, further comprising detent means for releasably locking said piston in each of a plurality of positions, each said position corresponding to the alignment of said chain guide means with a respective chain-engaging sprocket.

23. The automatic transmission of claim 22, wherein said piston is connected to said chain guide means by a piston rod having alternating bands of lesser and greater diameter, and said detent means comprises an L-shaped lever having the free end of the long arm of the L pivotally connected to said piston, the free end of the short arm of the L being releasably lockingly engageable with the bands of lesser diameter of said piston rod.

24. The automatic transmission of claim 23, wherein said detent means further comprises spring means for biasing said short arm of the L-shaped lever into engagement with the bands of lesser diameter of said piston rod.

25. The automatic transmission of claim 17, further comprising detent means for releasably locking each said piston in each of a plurality of positions, each said position corresponding to the alignment of said chain guide means with a respective chain-engaging sprocket.

26. The automatic transmission of claim 1, wherein said chain guide means comprises
chain-engaging means for engaging said linked chain, said chain-engaging means axially movable relative to said plurality of chain-engaging sprockets;
chain support means for supporting said chain engaging means for axial movement relative to said plurality of chain-engaging sprockets.

27. The automatic transmission of claim 26, wherein said chain-engaging means comprises
a first rotatable chain-engaging sprocket, having an axis;
a second rotatable chain-engaging sprocket, having an axis;
holding means for holding said first and second rotatable sprockets in spaced apart relation in a first plane, each of the axes of said first and second rotatable sprockets disposed parallel to said axis of rotation of said wheel, said holding means axially movable relative to said plurality of chain-engaging sprockets.

28. The automatic transmission of claim 27, wherein said chain support means comprises
a first annulus having an axis and an inner circumferential edge and an outer circumferential edge, said first annulus disposed in a second plane parallel to said first plane, said first annulus connected to said chain guide actuating means, said first annulus axially movable relative to said plurality of chain-engaging sprockets;
a second annulus having an axis and an inner circumferential edge and an outer circumferential edge, said first annulus and said second annulus coaxially disposed in said second plane with said inner edge of said second annulus in sliding contact with said outer edge of said first annulus;
first connecting means for connecting said first annulus to said second annulus, said first annulus and said second annulus being rotatable relative to each other about said common axis;
second connecting means for connecting said chain engaging means to said second annulus, said chain engaging means being axially spaced from said second annulus, said chain-engaging means being rotatable relative to said second annulus;
biasing means, operably connected to said second annulus and said chain engaging means, for resisting relative rotation between said chain engaging means and said second annulus.

29. The automatic transmission of claim 27, wherein said chain support means comprises:
a first annulus having an axis and an inner circumferential edge and an outer circumferential edge, said first annulus disposed in a second plane parallel to said first plane, said first annulus connected to said chain guide actuating means said first annulus axially movable relative to said plurality of chain-engaging sprockets;
a second annulus having an axis and an inner circumferential edge and an outer circumferential edge, said first annulus and said second annulus coaxially disposed in said second plane with said inner edge of said second annulus in sliding contact with said outer edge of said first annulus, said second annulus having a slot formed therein;
first connecting means for connecting said first annulus to said second annulus, said first and second annulus being rotatable relative to each other about said common axis;
second connecting means for connecting said chain engaging means to said axle and supporting said chain engaging means for axial movement relative to said plurality of chain-engaging sprockets, said chain engaging means being rotatable in a third plane parallel to said first plane relative to said second connecting means;
first biasing means, operably connected to said second connecting means and said chain engaging means, for resisting relative rotation between said chain-engaging means and said second connecting means;
third connecting means, slidably engaged in said slot in said second annulus, for connecting said chain engaging means to said second annulus for axial movement therewith, said chain-engaging means being axially spaces from said second annulus.

30. The automatic transmission of claim 29, wherein said first connecting means comprises a ball bearing race.

31. The automatic transmission of claim 29, wherein said second connecting means comprises:
a first support member having a first end and a second end, said first end rigidly detachably connectable to said axle;
a first pin member rigidly connected to said second end of said first support member and extending therefrom in a direction away from said wheel and parallel to said axis of rotation of said wheel;
a second pin member rigidly connected to said holding means and extending therefrom in a direction away from said wheel and parallel to said axis of rotation of said wheel;
linking means, pivotally connected to said first pin member and pivotally connected to said second pin member, for holding said first and second pin members parallel to one another during axial movement of said holding means relative to said plurality of chain-engaging sprockets.

32. The automatic transmission of claim 31, wherein said linking means comprises:
a first end member pivotally connected to said first pin member for pivotal motion in a plane substantially perpendicular to said axis of rotation of said wheel;

a second end member pivotally connected to said second pin member for pivotal motion in a plane substantially perpendicular to said axis of rotation of said wheel;

a pair of parallel link members, said link members each having a first end and a second end, said first ends spaced apart from one another by a predetermined distance and independently pivotally connected to said first end member for pivotal motion about respective first axes substantially transverse to said axis of rotation of said wheel, said second ends spaced apart from one another by said predetermined distance and independently pivotally connected to said second end member for pivotal motion about respective second axes substantially transverse to said axis of rotation of said wheel, each of said first ends being equidistant from a corresponding second end;

a second biasing means for yieldably resisting pivotal motion between said first end member and said first pin member;

said first biasing means being connected between said holding means and said second end member.

33. The automatic transmission of claim 32, wherein said third connecting means comprises:

a third pin, having a first end and a second end, said third pin extending parallel to said axis of rotation of said wheel, said first end rigidly connected to said second end member, said second end slidably received within said slot in said second annulus;

a pair of flanges, disposed substantially perpendicular to said third pin and rigidly attached thereto in spaced apart relation proximate said second end with one flange on each side of said slot, said pair of flanges cooperating to hold said third pin in sliding engagement with said slot and to prevent movement of said third pin in a direction parallel to said axis of rotation of said wheel.

34. The automatic transmission of claim 27, wherein said chain support means comprises:

a first annulus having an axis and an inner circumferential edge and an outer circumferential edge, said first annulus disposed in a second plane parallel to said first plane, said first annulus connected to said chain guide actuating means, said first annulus axially movable relative to said plurality of chain-engaging sprockets;

first connecting means for connecting said chain engaging means to said axle and supporting said engaging means for axial movement relative to said plurality of chain-engaging sprockets, said chain engaging means being rotatable in a third plane parallel to said first plane relative to said first connecting means;

biasing means, operably connected to said first connecting means and said chain-engaging means, for resisting relative rotation between said chain engaging means and said first connecting means;

second connecting means, receivably engaging said outer circumferential edge of said first annulus, for connecting said chain-engaging means to said first annulus for axial movement therewith, said chain engaging means being axially spaced from said first annulus.

35. The automatic transmission of claim 34, wherein said first connecting means comprises:

a first support member having a first end and a second end, said first end rigidly detachably connectable to said axle;

a first pin member rigidly connected to said second end of said first support member and extending therefrom in a direction away from said wheel and parallel to said axis of rotation of said wheel;

a second pin member rigidly connected to said holding means and extending therefrom in a direction away from said wheel and parallel to said axis of rotation of said wheel;

linking means, pivotally connected to said first pin member and pivotally connected to said second pin member, for holding said first and second pin members parallel to one another during axial movement of said holding means relative to said plurality of chain-engaging sprockets.

36. The automatic transmission of claim 35, wherein said linking means comprises:

a first end member pivotally connected to said first pin member for pivotal motion in a plane substantially perpendicular to said axis of rotation of said wheel; a second end member pivotally connected to said second pin member for pivotal motion in a plane substantially perpendicular to said axis of rotation of said wheel; a pair of parallel link members, said link members each having a first end and a second end, said first ends spaced apart from one another by a predetermined distance and independently pivotally connected to said first end member for pivotal motion about respective first axes substantially transverse to said axis of rotation of said wheel, said second ends spaced apart from one another by said predetermined distance and independently pivotally connected to said second end member for pivotal motion about respective second axes substantially transverse to said axis of rotation of said wheel, each of said first ends being equidistant from a corresponding second end;

a first biasing means for yieldably resisting pivotal motion between said first end member and said first pin member;

a second biasing means for yieldably resisting pivotal motion between said second end member and said second pin member.

37. The automatic transmission of claim 36, wherein said second connecting means comprises:

a third pin, having a first end and a second end, said third pin extending parallel to said axis of rotation of said wheel, said first end rigidly connected to said holding means;

a pivot arm, having a first end and a second end, disposed substantially transverse to said axis of rotation of said wheel, said pivot arm pivotally connected at said first end to said second end of said third pin for pivotal motion in a plane transverse to said axis of rotation of said wheel;

a grooved wheel, having a groove receivingly engageable of said outer circumferential edge of said first annulus, rotatably mounted on said second end of said pivot arm for rotation in said second plane;

biasing means, operably connected to said pivot arm and said holding means, for yieldingly applying a force to said pivot arm causing said pivot arm to pivot about said third pin and thereby press said groove of said grooved wheel into engagement with said outer circumferential edge of said first annulus.

38. In a bicycle comprising a supporting frame, a front ground engaging wheel rotatably mounted on an axle which is mounted on said supporting frame, a rear ground engaging wheel drivingly mounted on a first shaft, having an axis, which is journally mounted on said supporting frame, a transmission means for applying rotational force to said rear ground engaging wheel, a second shaft journally mounted on said supporting frame at substantially the fore and aft center of the frame between said front and rear wheels, foot driven pedals mounted on opposite ends of said second shaft, a drive sprocket fixedly mounted on said second shaft, said drive sprocket located adjacent said frame and inwardly of said pedal on that end of said second shaft, an endless chain loop engaging said drive sprocket and cooperating with said transmission means to transmit force on said pedals to said rear ground engaging wheel as rotational force, wherein said transmission means comprises:

(1) a plurality of chain-engaging sprockets disposed coaxially with and spaced apart along said axis of said first shaft, each of said sprockets having a predetermined diameter, each of said sprockets having a diameter different from the diameter of each of the other sprockets of said plurality of chain-engaging sprockets;

(2) drive means for drivingly connecting said plurality of chain-engaging sprockets to said rear gound engaging wheel;

(3) chain guide means, axially movable relative to said plurality of chain-engaging sprockets so as to be individually alignable with each of said sprockets in a respective plane, substantially transverse to said axis, containing a respective sprocket, for engaging said chain and guiding said chain into engagement with said respective aligned sprocket;

(4) chain guide actuating means, operatively connected to said chain guide means, for varying the axial position of said chain guide means automatically in response to the angular speed of said wheel;

whereby on angular rotation of said rear ground engaging wheel said chain guide means is axially moved by said chain guide actuating means to automatically guide said chain into engagement with a sprocket of a diameter in relation to the angular speed of said wheel.

39. In combination a spoked bicycle wheel, having an axis of rotation, and coaxially connected thereto a transmission means, engageable of a drive chain, for applying rotational force to said wheel, wherein said transmission means comprises:

(1) a plurality of chain-engaging sprockets disposed coaxially with and spaced apart along said axis of rotation of said wheel, each of said sprockets having a predetermined diameter, each of said sprockets having a diameter different from the diameter of each of the other sprockets of said plurality of chain-engaging sprockets;

(2) drive means for drivingly connecting said plurality of chain-engaging sprockets to said wheel;

(3) chain guide means, axially movable relative to said plurality of chain-engaging sprockets so as to be individually alignable with each of said sprockets in a respective plane, substantially transverse to said axis, containing a respective sprocket, for engaging said chain and guiding said chain into engagement with said respective aligned sprocket;

(4) chain guide actuating means, operatively connected to said chain guide means, for varying the axial position of said chain guide means automatically in response to the angular speed of said wheel;

whereby on angular rotation of said wheel said chain guide means is axially moved by said chain guide actuating means to automatically guide said chain into engagement with a sprocket of a diameter in relation to the angular speed of said wheel.

* * * * *